United States Patent [19]

Ohya et al.

[11] Patent Number: 5,303,343
[45] Date of Patent: Apr. 12, 1994

[54] MULTI-MEDIUM STORE-AND-FORWARD EXCHANGE APPARATUS AND METHOD OF CONTROLLING THE APPARATUS

[75] Inventors: Kouichi Ohya, Kokubunji; Hiroyuki Watanabe, Tachikawa, both of Japan

[73] Assignee: Kabushiki Kaisha Toshiba, Kawasaki, Japan

[21] Appl. No.: 585,705

[22] Filed: Sep. 20, 1990

[30] Foreign Application Priority Data

Sep. 27, 1989 [JP] Japan .................................... 1-251654

[51] Int. Cl.⁵ ...................... G06F 15/16; G06F 13/38
[52] U.S. Cl. .................................. 395/200; 395/500; 395/800; 364/240.8; 364/940.81
[58] Field of Search ................. 370/49.5, 53; 395/200, 395/500, 800

[56] References Cited

U.S. PATENT DOCUMENTS

| | | | |
|---|---|---|---|
| 3,678,391 | 7/1972 | Gough | 370/37 |
| 4,058,672 | 11/1977 | Crager et al. | 370/60 |
| 4,281,315 | 7/1981 | Bauer | 364/DIG 1 |
| 4,493,021 | 1/1985 | Agrawal | 364/DIG. 1 |
| 4,500,933 | 2/1985 | Chan | 364/DIG. 2 |
| 4,559,614 | 12/1985 | Peek | 364/DIG. 2 |
| 4,787,028 | 11/1988 | Finfrock | 364/DIG. 1 |

*Primary Examiner*—David Y. Eng
*Attorney, Agent, or Firm*—Finnegan, Henderson, Farabow, Garrett & Dunner

[57] ABSTRACT

A multi-medium store-and-forward exchange apparatus is connected to a plurality of line networks to convert a data received from a data originator terminal into another sort of data corresponding in attribute to another sort of line network and to transmit the converted data to a destination terminal. When the destination terminal does not handle the data to be transmitted from the data originator terminal, the store-and-forward exchange apparatus converts the data into another sort of data which can be handled at the destination terminal, and then transmits the converted data from its network controller in the apparatus. Further, an identification data of a terminal is registered to which a data arrival is announced at the time of the data reception in the form of a medium (voice, character or picture data) message previously prepared in the store-and-forward exchange apparatus. Identification data are allocated to individual system users, each user determines a terminal to be used depending on the attribute of the data to be transmitted, and the data to be transmitted is transmitted to the terminal.

23 Claims, 11 Drawing Sheets

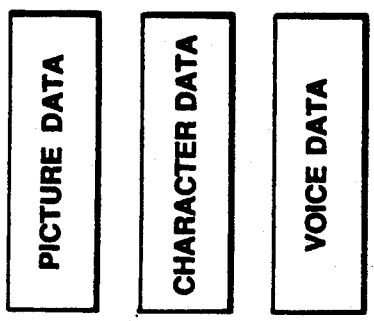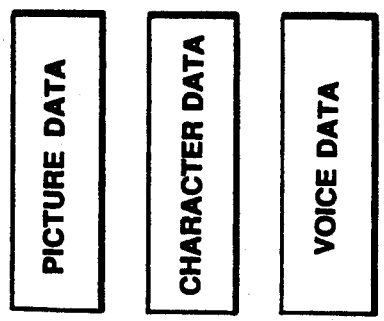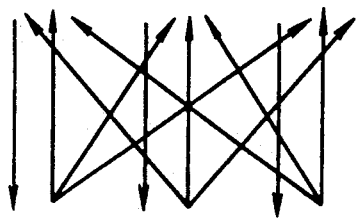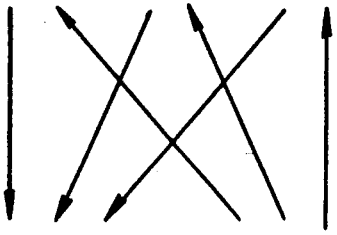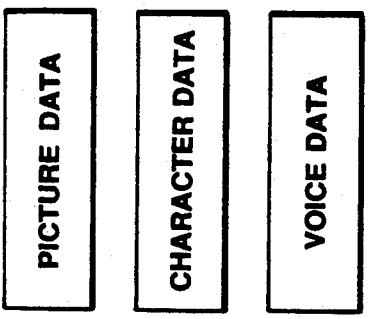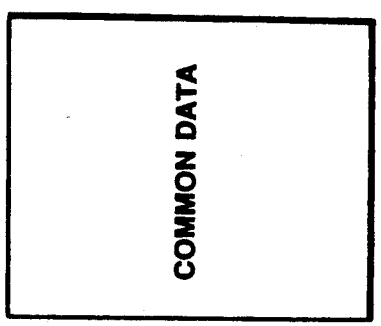
FIG.2(a)   FIG.2(b)

|  | | TRANSMIT/ RECEIVE IDLE | PARTY ID | START TIME |
|---|---|---|---|---|
| PICTURE NETWORK CONTROLLER | 1 | RECEIVE | $I_2$ | 9 : 15 |
|  | 2 | RECEIVE | $I_5$ | 9 : 46 |
|  | 3 | IDLE |  |  |
|  | 4 | IDLE |  |  |
|  | 5 | TRANSMIT | $I_1$ | 9 : 06 |
|  | 6 | TRANSMIT | $I_9$ | 9 : 35 |
|  | ⋮ | ⋮ |  |  |
| CHARACTER NETWORK CONTROLLER | 1 | IDLE |  |  |
|  | 2 | IDLE |  |  |
|  | 3 | IDLE |  |  |
|  | 4 | TRANSMIT | $C_3$ | 9 : 33 |
|  | ⋮ | ⋮ |  |  |
| VOICE NETWORK CONTROLLER | 1 | IDLE |  |  |
|  | 2 | TRANSMIT | $V_6$ | 9 : 25 |
|  | 3 | IDLE |  |  |
|  | 4 | IDLE |  |  |
|  | ⋮ | ⋮ |  |  |

FIG. 7

| USER ID | PICTURE TERMINAL ID | CHARACTER TERMINAL ID | VOICE TERMINAL ID | DATA TERMINAL ID |
|---|---|---|---|---|
| $U_1$ | $I_1$ | $C_1$ | $V_1$ | $D_1$ |
| $U_2$ | $I_2$ | $C_2$ | $V_2$ | $D_2$ |
| $U_3$ | $I_3$ | $C_3$ | $V_3$ | $D_3$ |
| ⋮ | ⋮ | ⋮ | ⋮ | ⋮ |
| $U_i$ | $I_j$ | $C_k$ | $V_l$ | $D_m$ |

FIG. 8

| TERMINAL ID | TERMINAL ATTRIBUTE | DIAL NO. |
|---|---|---|
| $I_1$ | I | $T_1$ |
| ⋮ | ⋮ | ⋮ |
| $I_j$ | I | $T_j$ |
| $C_1$ | C | $T_{j+1}$ |
| ⋮ | ⋮ | ⋮ |
| $C_k$ | C | $T_k$ |
| $V_1$ | V | $T_{k+1}$ |
| ⋮ | ⋮ | ⋮ |
| $V_l$ | V | $T_l$ |
| $D_1$ | D | $T_{l+1}$ |
| ⋮ | ⋮ | ⋮ |
| $D_m$ | D | $T_m$ |

FIG. 9

| USER ID | ANNOUNCEMENT TERMINAL ID |
|---|---|
| $U_1$ | $C_5$ |
| $U_2$ | $V_1$ |
| ⋮ | ⋮ |
| $U_i$ | $I_j$ |

FIG. 10

MULTI-MEDIUM STORE-AND-FORWARD EXCHANGE APPARATUS AND METHOD OF CONTROLLING THE APPARATUS

BACKGROUND OF THE INVENTION

1. Field of the Invention

The present invention relates to a multi-medium store-and-forward exchange apparatus for performing transfer, storage and conversion of various sorts of data and a method of controlling the apparatus, and more particularly, to a multi-medium store-and-forward exchange apparatus which is connected to a plurality of line networks so that the apparatus converts data received from communication terminals of one line network into data suitable for different line networks and sends the converted data to associated party terminals of the different line networks and a method of controlling the apparatus.

2. Description of the Related Art

A prior art store-and-forward exchange apparatus of the type referred to above has been connected to a single line exchange network so that the apparatus receives data from a terminal through the line exchange network and sends it to a party terminal through the same network.

There recently has been suggested a store-and-forward exchange apparatus connected to a plurality of line exchange networks of different types, including a voice line exchange network for transmitting voice signals, a picture line exchange network for transmitting picture data and a character line exchange network for transmitting character data.

The conventional store-and-forward exchange apparatus is basically designed so that the apparatus sends a voice signal received from a voice terminal (which generates the voice signal), to a party terminal through one of the lines connected to the voice line exchange network, sends a picture signal received from a picture terminal (which generates the picture signal), to a party terminal through one of the lines connected to the picture line exchange network, and sends a character signal received from a character terminal (which generates the character signal), to a party terminal through one of the lines connected to the character line exchange network. For this reason, when all the lines connected, e.g., to the picture line exchange network are in use but there is idle one of the lines connected, e.g., to the character line exchange network, the prior art store-and-forward exchange apparatus cannot transmit the data received through the picture line exchange network to the party terminal but must wait until one of the lines connected to the picture line exchange network becomes idle.

In order to remove the above disadvantage, it may be considered to determine the number of lines depending on the expected amount of the communication for each sort of media. Even in this case, however, when the amount of communication to line exchange network is unexpectedly increased, the transmission to terminals connected to that line exchange network is delayed and thus equal servicing to every terminal cannot be realized. For the purpose of overcoming this disadvantage, it may be considered to increase the number of lines connected to each of line exchange networks. This, however, involves another problem that the cost becomes high.

SUMMARY OF THE INVENTION

It is therefore an object of the present invention to provide a multi-medium store-and-forward exchange apparatus and a method of controlling the apparatus which can convert data received from a terminal in one line network into data suitable for a different line network and can transmit it to a destination terminal.

Another object of the present invention is to provide a multi-medium store-and-forward exchange apparatus and a method of controlling the apparatus which allow transmission and reception of data between terminals handling different media.

A further object of the present invention is to provide a multi-medium store-and-forward exchange apparatus and a method of controlling the apparatus which can automatically transmit an announcement of data arrival to terminals other than a destination terminal.

Yet another object of the present invention is to provide a multi-medium store-and-forward exchange apparatus and a method of controlling the apparatus which can pre-register a plurality of terminals handling different media for an identical identification data.

In the present invention, in the event where the destination terminal cannot handle a data transmitted from the data originator terminal, the multi-medium store-and-forward exchange apparatus converts the data into a data which the destination terminal can handle and transmits the converted data to the destination terminal through a network controller associated with the destination terminal.

Identification data of a terminal to which a data arrival announcement is to be output at the time of the data reception is registered in the exchange apparatus so that the data arrival announcement is sent to the terminal in the form of the associated medium (voice, character and picture data) messages previously prepared in the store-and-forward exchange apparatuses.

Identification data are allocated to individual users utilizing the system, and each user determines a terminal to be used according to the attribute (picture, character or voice) of a data to execute transmission of the data to the terminal.

In this case, when a terminal closest to the user is previously registered as its announcement terminal, the data arrival can be informed to the closest terminal.

BRIEF DESCRIPTION OF THE DRAWINGS

FIGS. 2(a) and 2(b) are a diagram for explaining input/output of various sorts of data and mutual conversion therebetween;

FIG. 7 shows an example of a control table for a communication controller used in the embodiment of FIG. 5;

FIG. 8 shows an example of a user ID table used in the embodiment of FIG. 5;

FIG. 9 shows an example of a dial number table used in the embodiment of FIG. 5;

FIG. 10 shows an example of an announcement receiver terminal table used in the embodiment of FIG. 5;

DESCRIPTION OF THE PREFERRED EMBODIMENTS

Embodiments of the present invention will be detailed by referring to the attached drawings.

Figure 1:
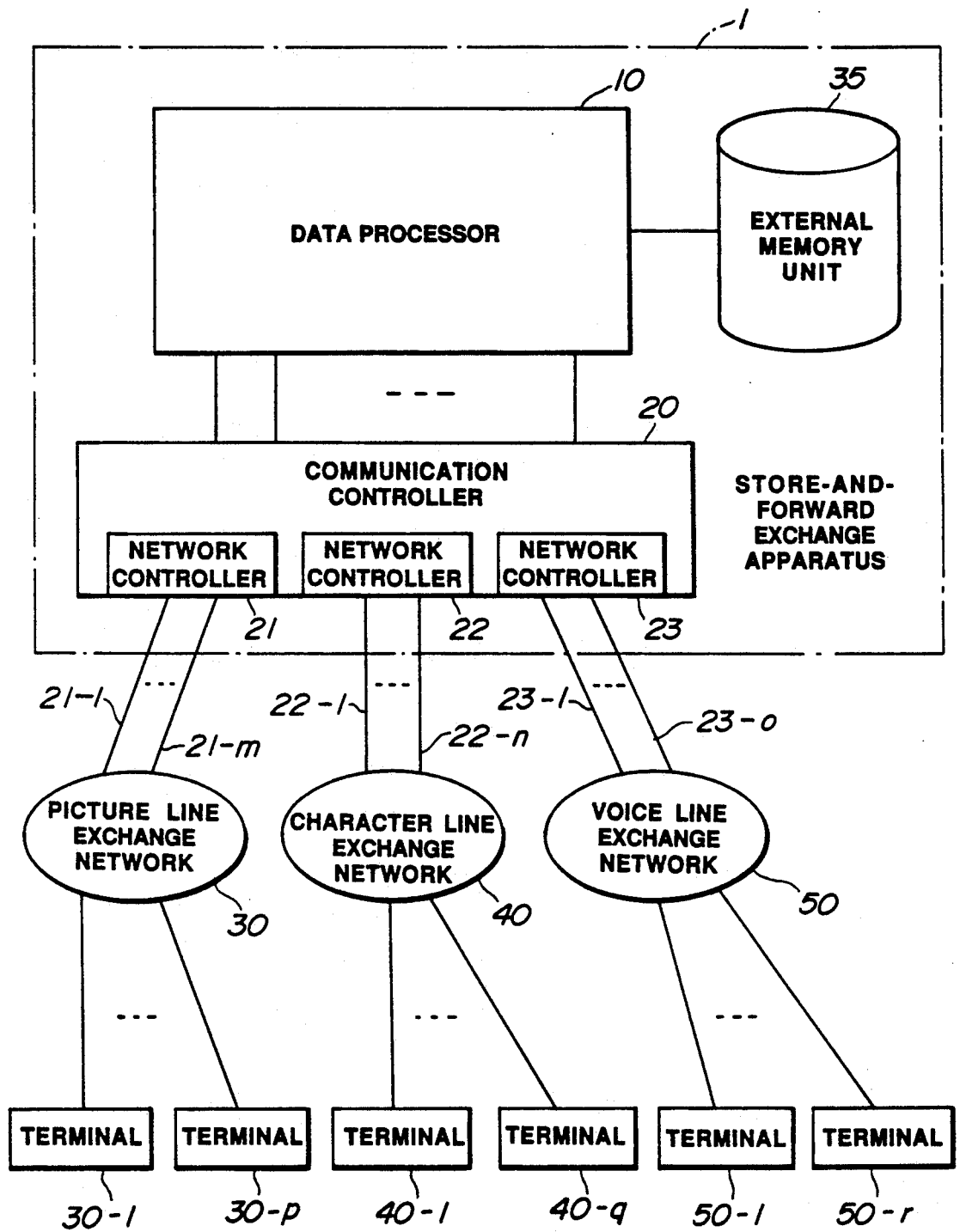
FIG. 1 is a block diagram showing an embodiment of a multi-medium store-and-forward exchange apparatus in accordance with the present invention.

Referring first to FIG. 1, there is shown a block diagram of a multi-medium store-and-forward exchange apparatus 1 in accordance with an embodiment of the present invention, which is connected through m picture lines 21-1 to 21-m and a picture line exchange network 30 to a plurality of picture terminals 30-1 to 30-p which can receive picture data, through n character lines 22-1 to 21-n and a character line exchange network 40 to a plurality of character terminals 40-1 to 40-q which can receive character data, and further through o voice lines 23-1 to 23-o and a voice line exchange network 50 to a plurality of voice terminals 50-1 to 50-r which can receive voice data, respectively.

More specifically, the store-and-forward exchange apparatus 1 comprises a data processor 10, a communication controller 20 and an external memory unit 35.

The data processor 10 acts to receive from the communication controller 20 picture, character and voice data, send these data to the external memory unit 35 as they are without any processing or convert these data to a single common data to be stored in the external memory unit 35, and also read out a data from the external memory unit 35, subject the read-out data to a desired conversion associated with the attribute of the destination terminal and transmit the converted data to the destination terminal through the communication controller 20. The functions of the data processor 10 are schematically shown in FIGS. 2(a) and 2(b), which functions will be detailed below. That is, FIG. 2(a) shows the processing of the data processor 10 when the data processor 10 sends the picture, character and voice data received through the communication controller 20 to the external memory unit 35 as they are, to be stored therein. In this case, more in detail, the data processor 10 outputs the received picture, character and voice data to the external memory unit 35 respectively as picture, character and voice data. The data processor 10 also reads out a picture data from the external memory unit 35; and sends the read-out picture data as it is to the communication controller 20 as a picture data or converts the read-out picture data into a character or voice data and then sends the converted data to the communication controller 20. Similarly, the data processor 10, when reading out a character data from the external memory unit 35, sends the read-out character data as it is to the communication controller 20 as a character data or converts the read-out character data into a picture or voice data and then sends the converted data to the communication controller 20. Likewise, the data processor 10, when reading out a voice data from the external memory unit 35, sends the read-out voice data as it is to the communication controller 20 as a voice data or converts the read-out voice data into a picture or character data and then sends the converted data to the communication controller 20.

FIG. 2(b) shows the processing of the data processor 10 when the data processor 10 converts the picture, character and voice data received through the communication controller 20 into a common data and then sends the common data to the external memory unit 35 to be stored therein. In this case, more in detail, the data processor 10 converts the received picture, character and voice data into a common data, e.g., into a character data and outputs the converted character data to the external memory unit 35; while the data processor 10 reads out a common data from the external memory unit 35, converts the read-out common data into a picture, character or voice data having the same attribute as the destination terminal, and then outputs the converted data to the communication controller 20.

The communication controller 20 comprises a picture network controller 21, a character network controller 22 and a voice network controller 23. The picture network controller 21 functions to transmit or receive picture data to or from the picture terminals 30-1 to 30-p through the picture lines 21-1 to 21-m and the picture line exchange network 30. The character network controller 22 functions to transmit or receive character data to or from the character terminals 40-1 to 40-q through the character lines 22-1 to 22-n and the character line exchange network 40. Similarly, the voice network controller 23 functions to transmit or receive voice data to or from the voice terminals 50-1 to 50-r through the voice lines 23-1 to 23-o and the voice line exchange network 50.

In this connection, the numbers m, n and o of picture lines 21-1 to 21-m, character lines 22-1 to 22-n and voice lines 23-1 to 23-o are previously determined by the respective communication frequencies or communication traffics of the picture, character and voice data.

The external memory unit 35 stores therein picture data, character data, voice data or common data to the picture, character and voice data.

Figure 3:
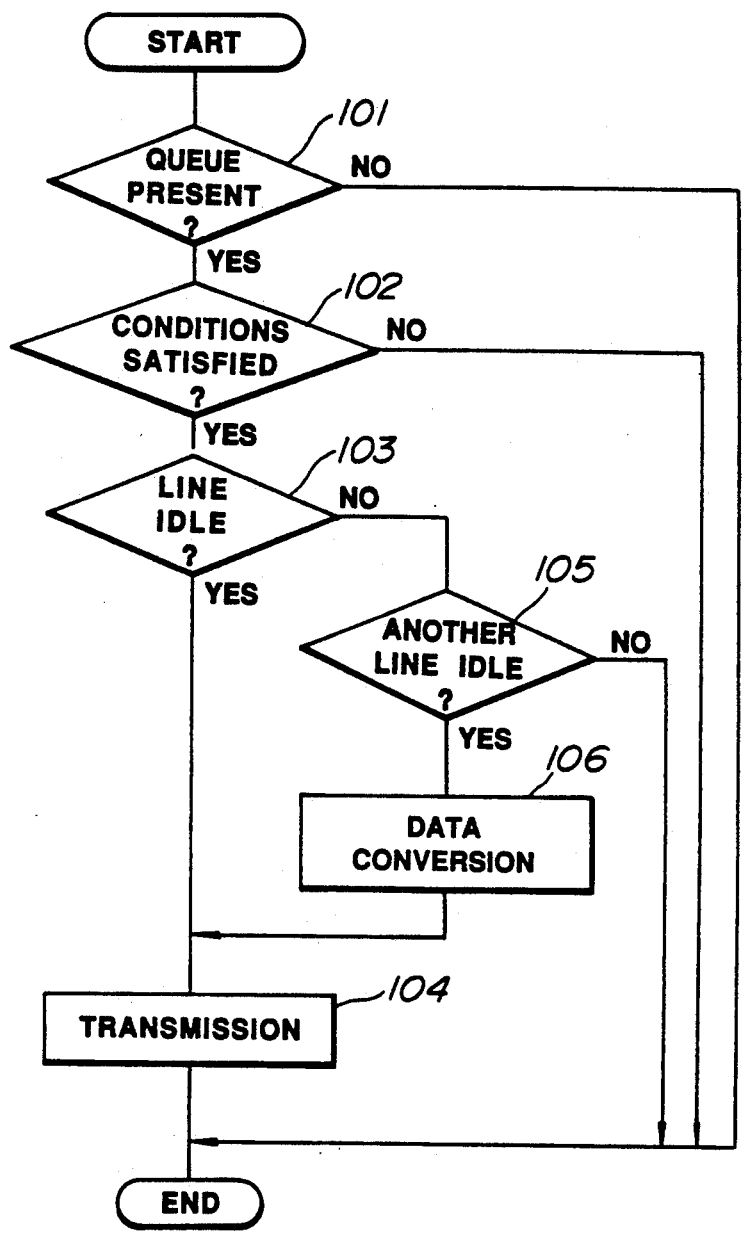
FIG. 3 is a flowchart for explaining the operation of the embodiment of FIG. 1.

Explanation will next be made with reference to a flowchart of FIG. 3 as to the control of the transmission when the store-and-forward exchange apparatus 1 transmits, for example, a voice data.

First, the data processor 10, when receiving a transmission request or transmission queue (step 101), reads out the destination information of the voice data associated with the transmission queue from the external memory unit 35 and starts its transmission control operation. Since the transmission conditions of the voice data are satisfied at the voice network controller 23 of the communication controller 20 (step 102), the data processor 10 judges through the voice network controller 23 of the communication controller 20 the presence or absence of idle one of the voice lines 23-1 to 23-o (step 103). When the data processor 10 judges the presence of an idle voice line, the voice network controller 23 seizes idle one of the voice lines 23-1 to 23-o in response to an instruction from the data processor 10, transmits a calling signal through the voice line exchange network 50 to, e.g., the voice terminal 50-1 indicative of the destination information informed from the data processor 10 to call the voice terminal 50-1 (step 104). When the voice terminal 50-1 answers to the calling signal, this causes the data processor 10 to read out the voice data from the external memory unit 35 and to transmit the read-out voice data to the voice terminal 50-1 through the voice network controller 23.

In other words, in the case where the store-and-forward exchange apparatus 1 is desired to transmit a voice data, if any one of the voice lines 23-1 to 23-o is idle then the voice network controller 23 transmits the voice data. In this case, the transmission control is the same as that of the prior art. Similarly, in the event where the store-and-forward exchange apparatus 1 is desired to transmit a picture or character data, if any one of the picture lines 21-1 to 21-m or any one of the character lines 22-1 to 22-n is idle then the picture or character network controller 21 or 22 transmits the picture or character data. Accordingly, data processor 10 transmits picture, character and voice data stored in the external memory unit 35 as they are.

In the step 103, if idle one of the voice lines 23-1 to 23-o is not present then the voice network controller 23 informs the data processor 10 of the absence of any idle voice line.

At this time, the data processor 10 judges that the processor 10 cannot transmit the voice data on the basis of the absence of any idle voice line and starts its transmission control operation to a predetermined data receiver terminal, e.g., to the character terminal 40-1 in place of the voice terminal 50-1.

More concretely, the data processor 10 first judges the presence or absence of idle one of the character lines 22-1 to 22-n through the character network controller 22 of the communication controller 20 (step 105). The data processor 10, when determining the presence of an idle character line, reads out a voice data destined for the voice terminal 50-1 from the external memory unit 35, recognizes a voice corresponding to the voice data, and converts the voice into a character data (step 106). And the character network controller 22, in response to an instruction from the data processor 10, seizes idle one of the character lines 22-1 to 22-n and transmits a calling signal via the character line exchange network 40 to the character terminal 40-1 (step 104) to thereby call the character terminal 40-1. A response of the character terminal 40-1 to the calling signal causes the data processor 10 to transmit the converted character code data to the character terminal 40-1 through the character network controller 22.

That is, even in the event where any one of the voice lines 23-1 to 23-o is not idle and thus it is impossible to transmit the voice data, if any one of the character lines 22-1 to 22-n is idle, then the data processor 10 converts the voice data into a character data and transmits the converted character data from the character network controller 22. As a result, even when any one of the voice lines 23-1 to 23-o for transmission of voice data is not idle, the data processor 10 can quickly transmit the contents of the voice data to be transmitted to another terminal (in this case, character terminal 40-1).

In the illustrated embodiment, as shown in FIG. 2(a), the data processor 10 can convert picture, character and voice data into their mutually different other sorts of data. As a result, the processing loop starting from the step 103 and ending in the step 104 via the steps 105 and 106 in FIG. 3 can be applied for the other sorts of data so that the converted data can be transmitted through the network controller associated with the sort of that data. For this reason, all the lines connected to the respective line exchange networks can be effectively utilized at all times.

If the data processor 10 receives no transmission request in the step 101, if the transmission conditions are not satisfied in the step 102, or if no idle line exists in the step 103 or 105, then the store-and-forward exchange apparatus 1 performs no transmission and is returned to its wait state.

The foregoing explanation has been made in connection with the case where the picture, character and voice data are previously stored in the external memory unit 35 as they are so that, when it is desired to transmit these data, the data conversion is carried out as necessary. However, the store-and-forward exchange apparatus may be arranged so that, as shown in FIG. 2(b) for example, the respective data are previously converted into a common data and stored in the external memory unit 35 and the common data is converted into the necessary sort of data at the time of transmission. In addition, the data conversion is not limited to the picture, character and voice data and any sort of data may be handled so long as the data allows mutual conversion.

Figure 4:
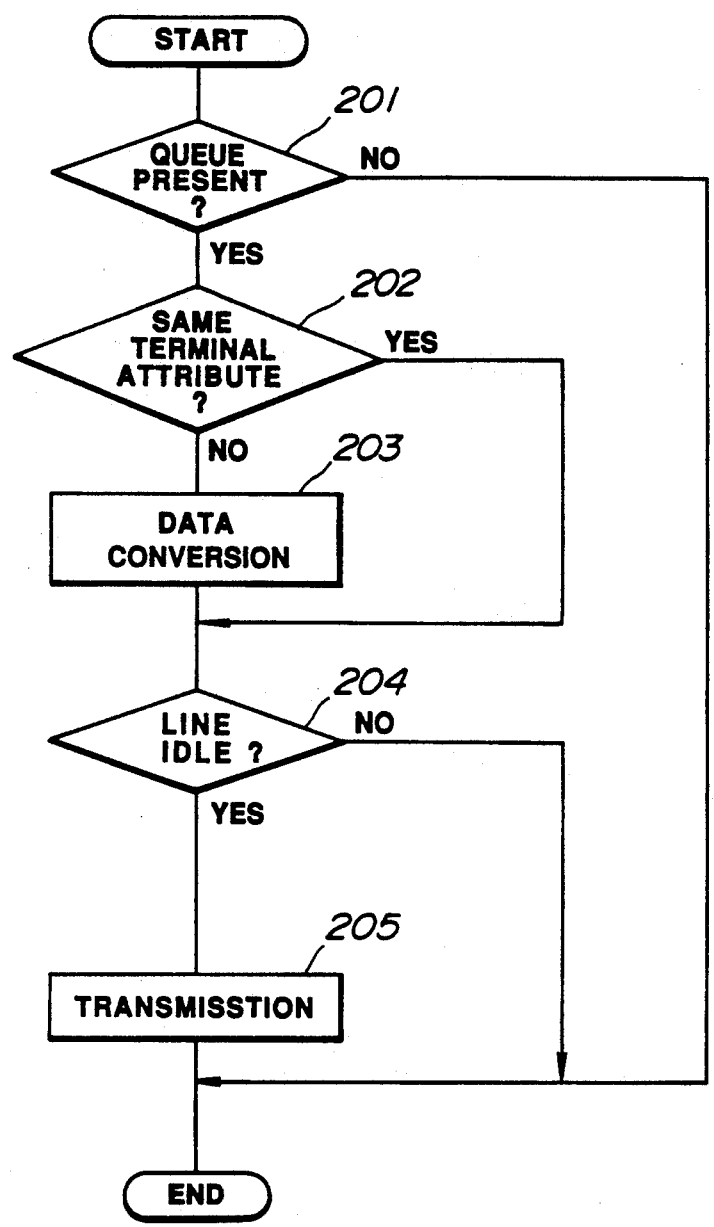
FIG. 4 is a flowchart for explaining the operation of another embodiment.

Explanation will next be made as to another example of the transmission control when the store-and-forward exchange apparatuses 1 transmits, for example, a voice data, with reference to a flowchart of FIG. 4.

First, the data processor 10, when receiving a transmission queue (step 201), reads out the destination information of the voice data from the external memory unit 35 and starts its transmission control operation. When the destination terminal of the voice data is a voice terminal, that is, when the data to be transmitted has the same attribute as the destination terminal (step 202), the data processor 10 judges through the voice network controller 23 of the communication controller 20 whether or not any one of the voice lines 23-1 to 23-o is idle (step 204). If any one of the voice lines 23-1 to 23-o is idle, then the voice network controller 23 responds to an instruction from the data processor 10, seizes the idle line, and transmits a calling signal through the voice line exchange network 50 to the terminal indicative of the destination information received from the data processor 10, e.g., to the voice terminal 50-1 (step 205) to call the voice terminal 50-1. The voice terminal, when responding to the calling signal, reads out the voice data from the external memory unit 35 and transmits the read-out voice data to the voice terminal 50-1 through the voice network controller 23.

Similarly, in the case where the store-and-forward exchange apparatuses 1 is desired to transmit a picture or character data, if the attribute of the data to be transmitted coincides with the attribute of the destination terminal and any one of the picture or character lines 21-1 to 21-m or 22-1 to 22-n is idle, then the picture or character network controller 21 or 22 transmits the data.

In the step 202, when the attribute of the destination terminal does not coincide with that of the data to be transmitted, i.e., that of the data originator terminal, for example, when the data originator terminal is a voice terminal and the destination terminal is the character terminal 40-1, the data processor 10 converts the data to be transmitted, i.e., the voice data into a character data corresponding to the voice data (step 203). And the data processor 10 judges the presence or absence of idle one of the character lines 22-1 to 22-n through the character network controller 22 (step 204). If there is an idle character line, then the data processor 10 seizes the idle line and transmits a calling signal to the character terminal 40-1 through the character line exchange network 40 (step 205) to call the character terminal 40-1. When the character terminal 40-1 answers to the calling signal, the data processor 10 transmits the converted character data to the character terminal 40-1 through the character network controller 22.

That is, when the destination terminal of the voice data is a character data terminal, the data processor 10 converts the voice data into the corresponding character code data and transmits the character data from the character network controller 22. In this way, even when the destination terminal is different in attribute from the data originator terminal, the store-and-forward exchange apparatus 1 can transmit the data.

Even in this case, data processor 10 can convert the picture, character and voice data into their mutually different other sorts of data as shown in FIG. 2(a). As a result, the processing loop starting from the step 202 and ending in the step 205 via the steps 203 and 204 in FIG. 4 can be applied for the other sorts of data so that the respective transmission data can be transmitted to a terminal different in attribute from the data originator terminal.

If the data processor 10 receives no transmission request in the step 201, or if no idle line exists in the step 204, then the store-and-forward exchange apparatus 1 performs no transmission and is returned to its wait state.

An exemplary detailed arrangement of the data processor 10 in FIG. 1 will be described with reference to FIG. 5.

Figure 5:
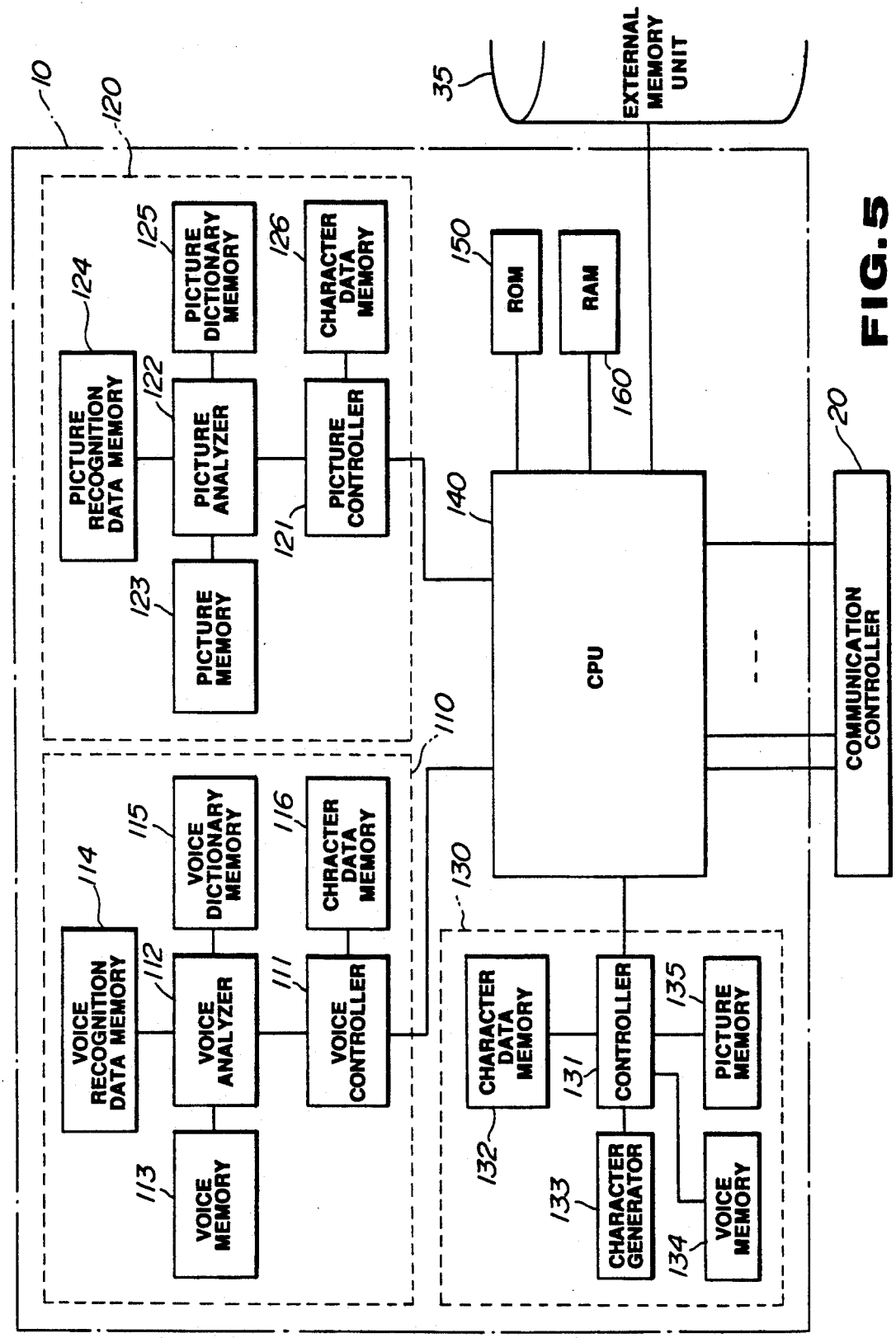
FIG. 5 is a block diagram showing an example of a data processor used in FIG. 1.

The data processor 10 shown in FIG. 5 comprises a voice section 110, a picture section 120, a synthesizer section 130, a central processing unit (CPU) 140, a read-only memory (ROM) 150 and a random access memory (RAM) 160.

More specifically, the voice section 110 includes a voice controller 111, a voice analyzer 112, a voice memory 113, a voice recognition data memory 114, a voice dictionary memory 115, and a character data memory 116. The voice section 110 functions to convert a voice data into a corresponding character data. More in detail, the voice controller 111, when accepting from the CPU 140 a voice data that is already stored in the external memory unit 35, sends the accepted voice data to the voice analyzer 112. The voice analyzer 112, when receiving the voice data, once stores a predetermined time length of the voice data in the voice memory 113. And the voice analyzer 112 divides, on the basis of voice recognition data stored in the voice recognition data memory 114, the predetermined time length of voice data stored in the voice memory 113 into voice segments each corresponding to one character, recognizes the voice segments on the basis of voice data corresponding to arbitrary characters stored in the voice dictionary memory 115, and converts the recognized voice segments into a character data.

The voice analyzer 112, when completing the above operation, sends the converted character data to the voice controller 111.

The voice controller 111, when receiving the character data from the voice analyzer 112, temporarily stores the received character data in the character data memory 116. The above processing is repeated to convert a voice data into a character data.

The picture section 120 includes a picture controller 121, a picture analyzer 122, a picture memory 123, a picture recognition data memory 124, a picture dictionary memory 125 and a character data memory 126. The picture section 120 functions to convert a picture data into a character data. More concretely, the picture controller 121, whenever receiving a picture data corresponding to one page from the external memory unit 35 through the CPU 140, supplies the picture data to the picture analyzer 122. The picture analyzer 122, when receiving the picture data corresponding to one page, once stores the received data in the picture memory 123. And the picture analyzer 122 divides, on the basis of picture recognition data already stored in the picture recognition data memory 124, the one-page picture data stored in the picture memory 123 into picture segments each corresponding to one character, recognizes the characters of the picture signal on the basis of character feature data stored in the picture dictionary memory 125, and converts the recognized characters into a character data.

The picture analyzer 112, when completing the above operation, sends the converted character data to the picture controller 121.

The picture controller 121, when receiving the character data from the picture analyzer 122, temporarily stores the received character data in the character data memory 126. The above processing is repeated to convert a picture data into a character data.

The synthesizer section 130 includes a controller 131, a character data memory 132, a character generator 133, a voice memory 134 and a picture memory 135, and functions to convert a character data into a voice or picture data. More in detail, the controller 131, when receiving from the CPU 140 a character data through the external memory unit 35 or through the character data memory 116 of the voice section 110 or through the character data memory 126 of the picture section 120, stores the received character data in the character data memory 132. And the controller 131 converts the character data stored in the character data memory 132 into a voice or picture data by utilizing an output of the character generator 133. And the controller 131 temporarily stores the converted voice or picture data in the voice or picture memory 134 or 135. The above processing is repeated to convert a character data into a voice or picture data.

The ROM 150 and RAM 160 are used to store control data necessary for the data processor 10. More concretely, the ROM 150 stores therein stationary control data, while the RAM 160 stores therein a user ID table, a dial number table, a communication controller control table and so on.

The user ID table shows relations between users (distinguished by their IDs (identifications)) and terminals in the store-and-forward exchange apparatus, and an example of the user ID table is given in FIG. 8. As will be seen from the drawing, user IDs ($U_l$ to $U_j$) are listed in the user ID table in association with picture terminals IDs ($I_l$ to $I_j$), character terminal IDs ($V_l$ to $V_l$) and data terminal IDs ($D_l$ to $D_m$).

The dial number table shows relations between the terminal IDs, terminal attributes and terminal dial numbers, and an example of the dial number table is given in FIG. 9. As shown in the drawing, the terminal attributes (I, C and V) and the terminal dial numbers ($T_l, \ldots, T_j, T_k, T_l, \ldots,$ and $T_m$) are listed in the dial number table in association with the terminals IDs ($I_l$ to $I_j$, $C_l$ to $C_k$, $V_l$ to $V_l$, and $D_l$ to $D_m$).

The communication controller control table shows relations between the picture, character and voice network controllers 21, 22 and 23, the states, party terminal IDs and communication start times of the lines connected to the respective network controllers. An example of the communication controller control table is shown in FIG. 7. The states of the lines connected to the picture, character and voice network controllers 21, 22 and 23 can be known by making reference to this communication controller control table.

Figure 6:
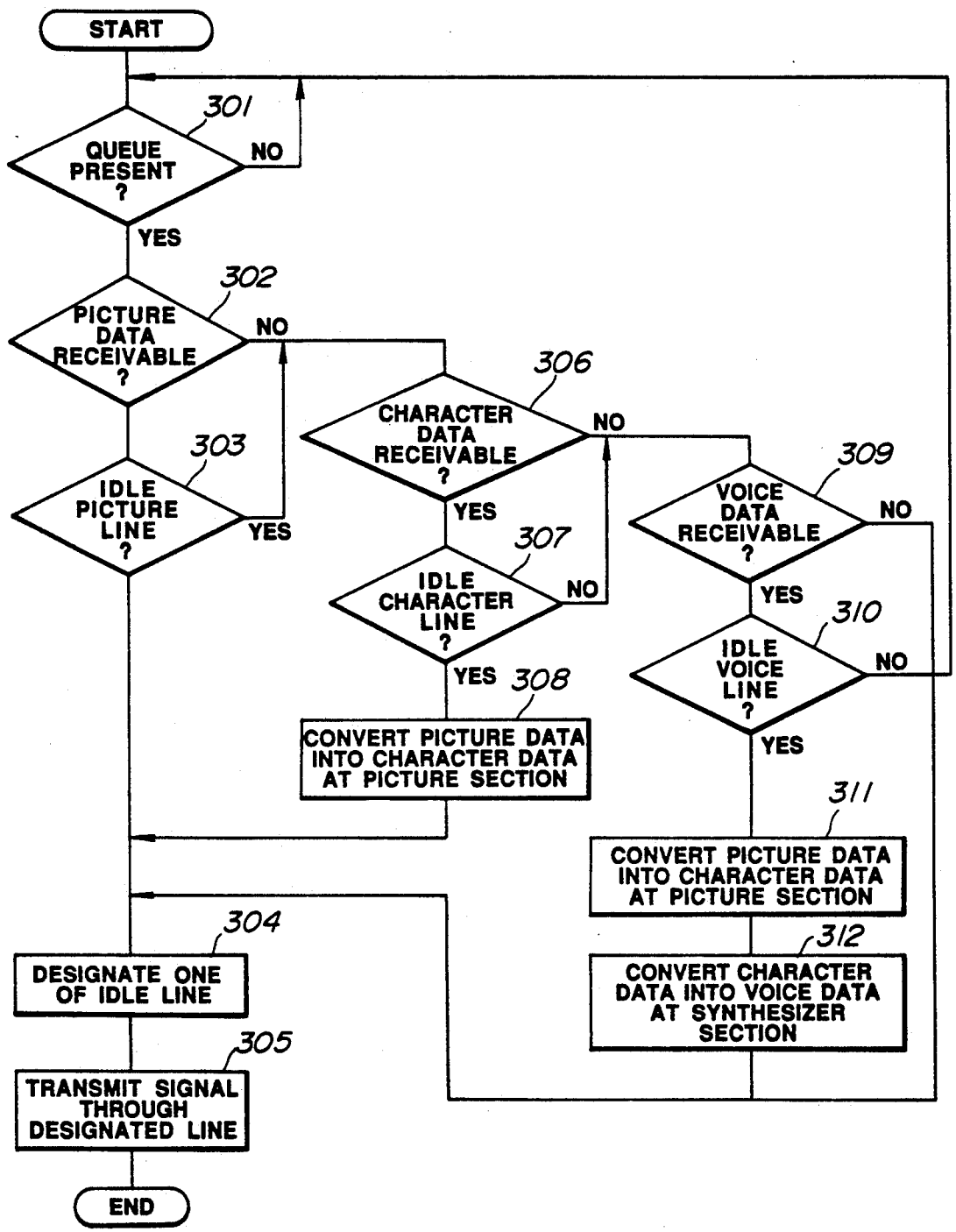
FIG. 6 is a flowchart for explaining the operation of the embodiment of FIG. 5.

Next, explanation will be made as to the operation of the store-and-forward exchange apparatus employing the data processor of FIG. 5 when the apparatus is desired to transmit a picture data, by referring to a flowchart of FIG. 6.

When the data processor 10 receives a transmission queue (step 301), the processor first checks the possession or non-possession of a picture reception function in the party terminal (step 302). This checking operation is carried out by making reference to the attribute of the party terminal in the dial number table (refer to FIG. 9) stored in the RAM 160. If the party terminal has the picture reception function, then the data processor 10 checks the presence or absence of an idle picture line (step 303). The idle line checking operation is carried out by making reference to the communication controller control table (refer to FIG. 7) stored in the RAM 160. For example, in this case, the data processor 10 examines the transmit/receive/idle state information of the lines of the picture network controller in the communication controller contrail table of FIG. 7 and when finding an idle picture line, judges the presence of the idle line.

In the step 303, when the data processor 10 determines the presence of idle picture lines, the processor specifies one of the idle lines (step 304) and transmits the picture signal through the specified line (step 305).

When the data processor 10 judges in the step 302 that the party terminal has no picture reception function or judges in the step 303 that any one of the picture lines is not idle, the processor examines whether or not the party terminal has a character reception function (step 306). This function examining operation is carried out by making reference to the attribute of the party terminal in the dial number table 8 (refer to FIG. 9) stored in the RAM 160. If the party terminal has the character reception function, then the data processor 10 examines the presence or absence of idle one of the character lines (step 307). This idle-line examining operation is carried out by referencing to the communication controller control table (see FIG. 7) stored in the RAM 160. In this case, the data processor 10 checks the transmit/receive/idle state information of the lines of the character network controller in the communication controller control table of FIG. 7 and when finding an idle character line, judges the presence of the idle character line.

In the step 307, when the data processor 10 judges the presence of an idle character line, the processor converts into a character data the picture data to be transmitted to the destination terminal. The picture-to-character conversion is carried out at the picture section 120 in FIG. 5.

When having completed the conversion from the picture data to the character data, the data processor 10 specifies one of idle ones of the character lines (step 304) and transmits the converted character signal through the specified idle character line (step 305).

When the data processor 10 judges in the step 306 that the party terminal has no character reception function or judges in the step 307 that any one of the character lines is not idle, the processor examines whether or not the party terminal has a voice reception function (step 309). This function examining operation is carried out by making reference to the attribute of the party terminal in the dial number table 8 (refer to FIG. 9) stored in the RAM 160. If the party terminal has the voice reception function, then the data processor 10 examines the presence or absence of idle one of the voice lines (step 310). In this case, the data processor 10 checks the transmit/receive/idle state information of the lines of the voice network controller in the communication controller control table of FIG. 7 and when finding an idle voice line, judges the presence of the idle voice line.

In the step 310, when the data processor 10 judges the presence of an idle voice line, the processor converts into a voice data the picture data to be transmitted to the destination terminal. The picture-to-voice conversion is carried out at the picture section 120 and at the synthesizer section 130 in FIG. 5.

That is, the picture signal is converted first at the picture section 120 (step 311) and then the converted character information is further converted at the synthesizer section 130 into the voice signal (step 312).

When having completed the conversion from the picture data to the voice data, the data processor 10 specifies one of idle ones of the voice lines (step 304) and transmits the converted voice signal through the specified idle voice line (step 305).

When the data processor 10 judges in the step 309 that the party terminal has no voice reception function, the processor returns to a stand-by state as disabled transmission.

When the data processor 10 judges the absence of any idle character lines in the step 307, the processor returns to the step 301.

Next, the data-arrival announcing operation will be explained, as an example, in connection with a case where the store-and-forward exchange apparatus 1 transmits a picture data from the picture terminal 30-1 to the picture terminal 30-p.

Figure 11:
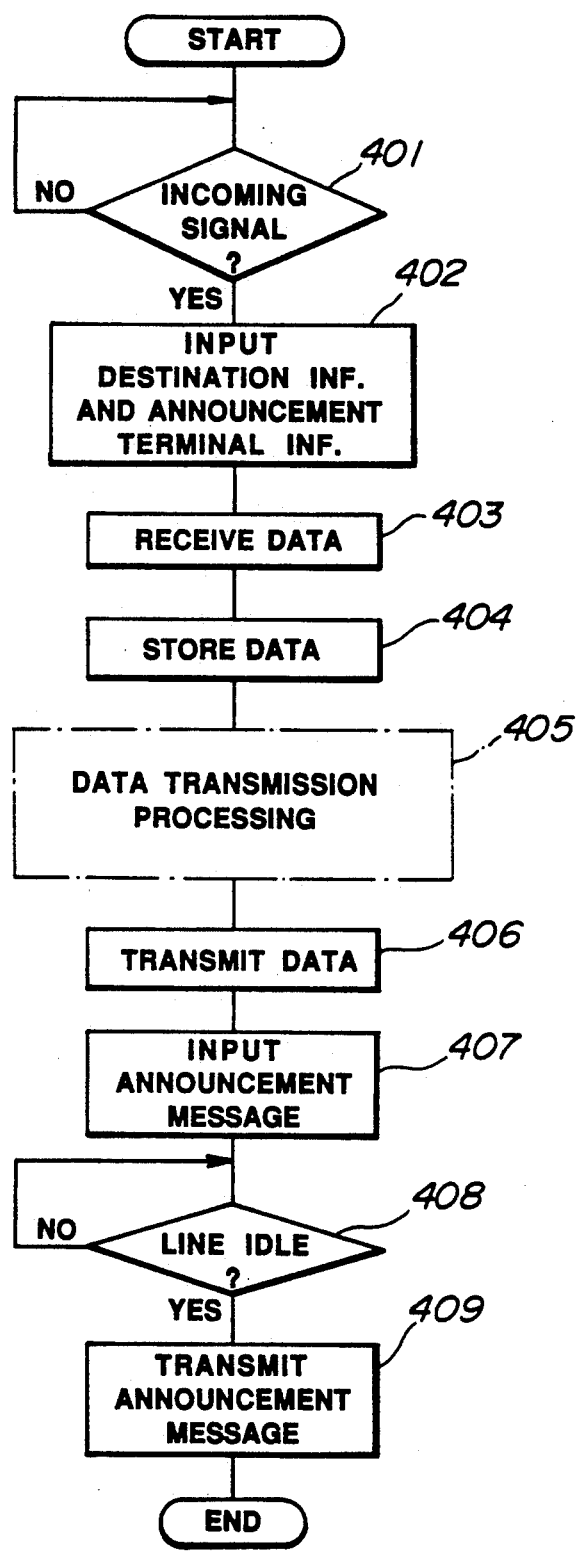
FIG. 11 is a flowchart for explaining the operation of announcing a data arrival message.

First, the picture network controller 21, when receiving an incoming signal from the picture terminal 30-1, detects the arrival of the incoming signal (step 401) and informs the CPU 140 of the signal arrival as shown in FIG. 11.

The picture network controller 21 then receives the destination information and announcement receiver information indicative of, for example, the voice terminal 50-1 from the signal originator terminal (step 402). Subsequently, the picture network controller 21 receives the picture data (step 403) and stores it in the external memory unit 35 (step 404).

Thereafter, the data processor 10 executes substantially the same transmission processing as explained in connection with FIG. 4 (step 405).

After transmitting the picture data to the picture data terminal 30-p (step 406), in order to transmit an announcement message to the voice terminal 50-1 corresponding to the announcement receiver information, the data processor 10 reads out from the external memory unit 35 an announcement message, e.g., a voice data saying "the picture data was transmitted" previously stored in the external memory unit 35 (step 407).

Then the data processor 10 checks the presence or absence of idle one of the voice lines 23-1 to 23-o (step 408) and when finding idle one of the voice lines 23-1 to 23-o, transmits the announcement message of the voice data to the voice terminal 50-1 through the voice network controller 23 (step 409). If failing to find any idle one in the step 408, then the data processor 10 waits until any one of the voice lines 23-1 to 23-o becomes idle.

In the foregoing embodiment, explanation has been made in connection with the case where the attribute of the data originator terminal coincides with that of the destination terminal. When the data originator terminal is different in attribute from the destination terminal, however, the data to be transmitted is converted so as to coincide with the attribute of the destination terminal, as a matter of course.

It is also possible to output the announcement message to any of the picture, character and voice terminals.

Explanation will next be made as to the data-receiver specifying operation by referring to a flowchart of FIG. 12 and using the user ID table of FIG. 8.

Assume now that the party terminal is specified by a user ID U2. Then, as shown in FIG. 12, the CPU 140, when receiving a transmission queue (step 501), first reads out from the RAM 160 the user ID U2 indicative of a user to be transmitted and starts its transmission control operation. When a data to be transmitted is, for example, a character data, the CPU 140 reads out from the user ID table a character terminal ID C2 corresponding to the read-out user ID U2 (step 502).

The CPU 140 checks whether or not any one of the character lines 40-1 to 40-q through which the character code data is to be transmitted is idle (step 503). If any one of the character lines 40-1 to 40-q is idle, then the CPU 140 reads out a dial number Tj+2 of the character terminal C2 from the dial number table of FIG. 9 (step 504), and transmits the read-out dial number from the character network controller 22 through idle one of the character lines 40-1 to 40-q to the character terminal C2 to send the character data thereto (step 505).

When the CPU 140 judges the adsence of a transmission queue in the step 501 or judges the absence of any idle character line in the step 503, the CPU is put in its wait state.

Although the foregoing explanation has been made in the connection with the case where the data to be transmitted is of the character type, substantially the same explanation can be similarly applied for the picture and voice data.

Figure 12:
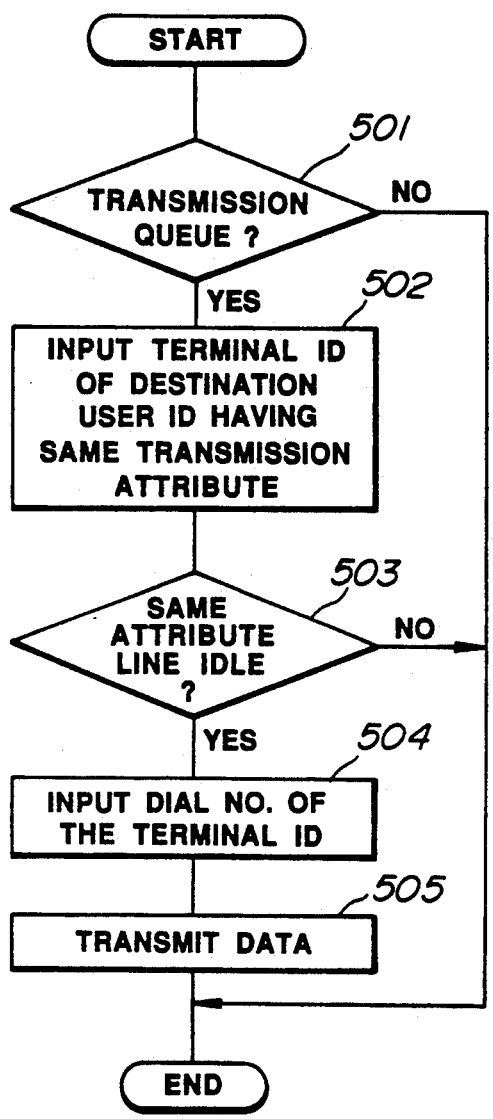
FIG. 12 is a flowchart for explaining the operation of limiting the number of data receiver terminals to a small value and sending a data to one of the data receiver terminals having the same attribute as the data sender terminal.

Further, the configuration of FIG. 12 may be modified so that, when any one of the lines having the same attribute as the data to be transmitted is not idle, the data is converted into another sort of data having the same attribute as another sort of lines including an idle line. In this case, another one of the terminals for the same user ID is selected.

The present invention may be arranged so that, as shown by the table in FIG. 10, announcement terminals IDs (C5 to Ij) are previously registered in associated with the user IDs (U1 to Ui), a data is transmitted based on the configuration of FIG. 12 and thereafter an announcement terminal ID to inform the message arrival at the user ID is input on the basis of the table of FIG. 10 to thereby automatically inform the announcement terminal of the message arrival.

Figure 13:
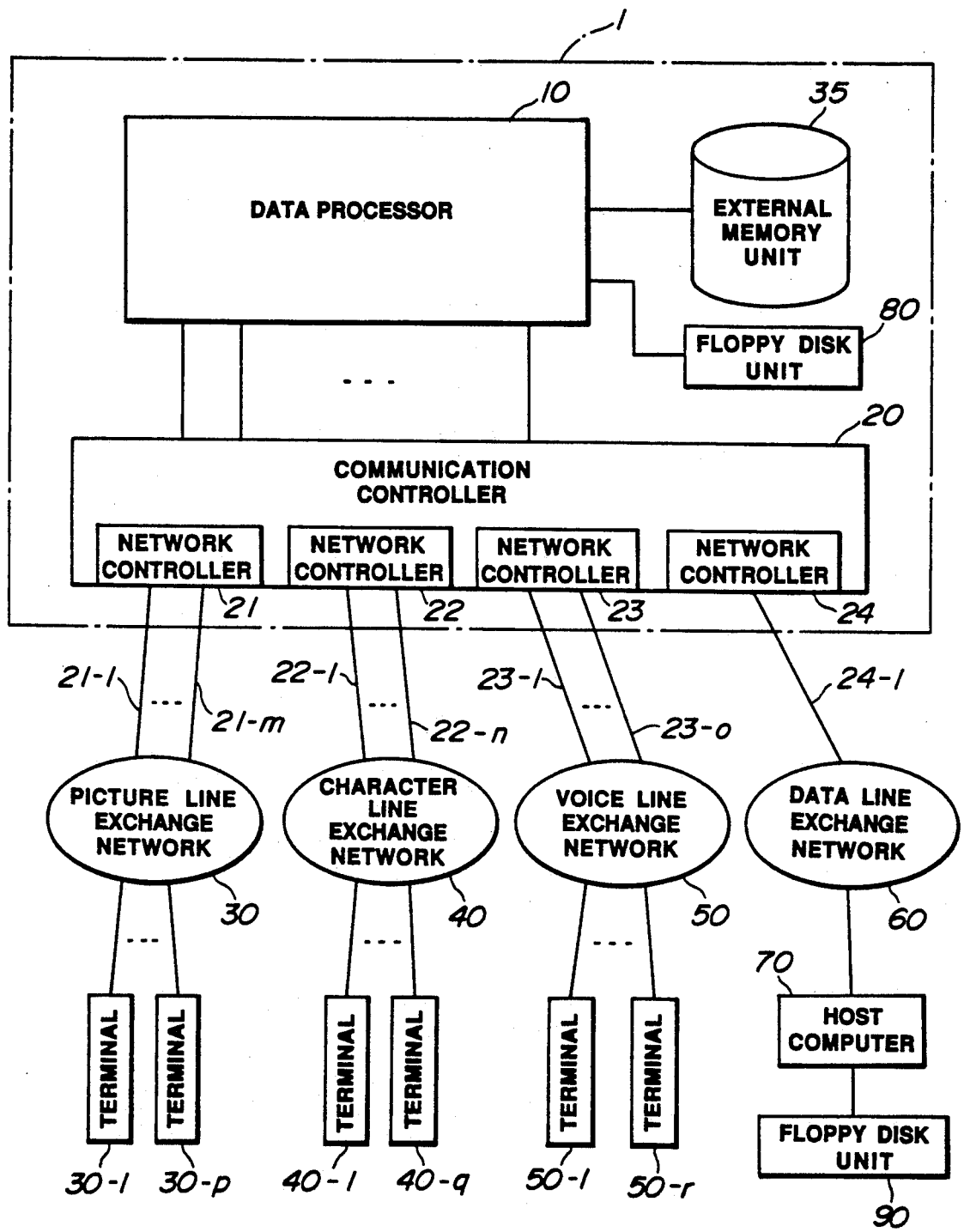
FIG. 13 is a block diagram showing an arrangement of the multi-medium store-and-forward exchange apparatus of the present invention connected with a host computer.

The present invention may be also arranged so that, as shown in FIG. 13, a host computer 70 is connected to the data processor 10 through a data line exchange network 60, a data line 24-1 and a data network controller 24 to generate the management information of the tables of FIGS. 7 to 10 on the basis of a personnel-information data base, a company-organization data base, a network-management data base and so on. In this case, when these data bases are modified, the host computer 70 generates a data for management of the store-and-forward exchange apparatus and sends the management data to the data network controller 24 through the data line exchange network 60 and data line 24-1.

The data processor 10 receives the management data from the data network controller 24 and stores it in the RAM 160 of FIG. 5.

In this connection, the timing of using the management data may be determined arbitrary as necessary but without causing any contradiction in the system operation. For example, the management data may be used at the very time of receiving it or at day intervals.

In addition, the host computer 70 may output its generated management data to such an external memory medium as a floppy disk 90, or the data processor 10 may input the management data from such an external memory medium input device as a floppy disk unit 80.

What is claimed is:

1. A multi-medium store-and-forward exchange apparatus comprising:
   a first network controller, connected to a first line network having a plurality of lines for transmitting and receiving data of a first signal format;
   a second network controller, connected to a second line network having a plurality of lines, for transmitting and receiving data of a second signal format different from said first signal format;
   means for storing data of the first and second signal formats received by the first and second network controllers through the first and second line networks, respectively;
   means for monitoring states of the lines of the first and second line networks and for judging the presence and absence of idle lines in each of the first and second line networks;
   means for converting data of the first signal format to data of the second signal format when data of the first signal format stored in the storage means is to be transmitted and the monitoring means judges the absence of any idle line in the first line network and the presence of an idle line in the second line network; and
   means for transmitting the data converted by the data conversion means through the second network controller to the idle line.

2. A multi-medium store-and-forward exchange apparatus as set forth in claim 1, further comprising a third network controller, connected to a third line network having a plurality of lines, for transmitting and receiving data of a third signal format different from said first and second signal formats; and wherein
   said storing means stores data of the first, second, and third signal formats received by the first, second, and third network controllers through the first, second, and third line networks, respectively;
   said monitoring means monitors states of the first, second, and third line networks and judges the presence and absence of idle lines in each of the first, second, and third line networks;
   said data converting means converts data of the first signal format to data of the second signal format when data of the first signal format stored in the storing means is to be transmitted and the monitoring means judges the absence of any idle line in the first line network and the presence of an idle line in the second line network, and converts data of the first signal format to data of the third signal format when data of the first signal format stored in the storing means is to be transmitted and the monitoring means judges the absence of any idle line in each of the first and second line networks and the presence of an idle line in the third line network; and the transmission control means transmits data converted by the data converting means through the second network controller when the converted data is of the second signal format and transmits the data converted by the data converting means through the third network controller when the converted data is of the third signal format.

3. A multi-medium store-and-forward exchange apparatus as set forth in claim 2, wherein the first signal format is picture data corresponding to a picture image, the second signal format is voice data corresponding to a voice, and the third signal format is character data composed of character codes.

4. A multi-medium store-and-forward exchange apparatus as set forth in claim 1, wherein the storing means comprises common data conversion means for converting the data received by the first and second network controllers through the first and second line networks into common data, and common data storage means for storing the common data converted by the common data conversion means.

5. A multi-medium store-and-forward exchange apparatus as set forth in claim 1, wherein the monitoring means comprises a control table for recording therein use states of the lines connected to the first and second network controllers, and judging means for judging states of the lines on the basis of contents of the control table.

6. A multi-medium store-and-forward exchange apparatus as set forth in claim 1, wherein the data converting means performs mutual conversion among two of picture data corresponding to a picture image and composed of a plurality of character strings, voice data corresponding to a voice, and character data composed of a plurality of character code strings.

7. A multi-medium store-and-forward exchange apparatus as set forth in claim 2, wherein the data converting means performs mutual conversion among picture data corresponding to a picture image and composed of a plurality of character strings, voice data corresponding to a voice, and character data composed of a plurality of character code strings.

8. A multi-medium store-and-forward exchange apparatus as set forth in claim 7, wherein the data converting means comprises:

means for analyzing picture data corresponding to a picture image composed of a plurality of characters and for converting the picture data into character data composed of character codes corresponding to characters constituting the picture data;

means for analyzing voice data corresponding to a voice and for converting the voice data into character data composed of character codes corresponding to characters of said voice; and means for analyzing character data composed of a plurality of character codes and for converting the character data into picture data corresponding to a picture image composed of characters represented by the character codes and for converting the character data into voice data corresponding to characters represented by the character codes.

9. A multi-medium store-and-forward exchange apparatus comprising:

first conversion means for analyzing picture data corresponding to a picture image composed of a plurality of characters and for converting the picture data into character data composed of character codes corresponding to characters constituting the picture data;

second conversion means for analyzing voice data corresponding to a voice and for converting the voice data into character data composed of character codes corresponding to characters of the voice constituting the voice data;

third conversion means for analyzing character data composed of a plurality of character codes and for converting the character data into picture data corresponding to a picture image composed of characters represented by character codes and for converting the character data into voice data corresponding to characters represented by character codes;

first network control means, connected through a plurality of lines to a first line network, for transmitting and receiving picture data;

second network control means, connected through a plurality of lines to a second line network, for transmitting and receiving voice data;

third network control means, connected through a plurality of lines to a third line network, for transmitting and receiving character data;

means for monitoring states of lines connected to the first, second, and third network control means;

means for storing picture, voice and character data received respectively through the first, second and third network control means;

means for instructing one of the first, second and third conversion means to convert data to be transmitted when data having a format of one of picture data, voice data, and character data stored in the storing means is to be transmitted and the monitoring means judges an absence of any idle line connected to a one of the network control means for transmitting data of a same format as the data to be transmitted, into a format of data associated with another one of the network control means connected to an idle line; and means for transmitting data converted by the one of the first, second and third conversion means through the network control means connected to the idle line.

10. A multi-medium store-and-forward exchange apparatus comprising:

a plurality of network control means, each connected to a different line network having a plurality of lines, for transmitting and receiving a plurality of sorts of mutually convertible data having different signal formats, each network control means being associated with one sort of data;

means for storing the plurality of sorts of data received by the plurality of network control means;

means for judging, when data stored in the storage means is to be transmitted, whether or not a sort of the data to be transmitted conforms to an attribute indicative of a sort of data receivable by a destination terminal;

means for converting the data to be transmitted into different sort of data which conforms to the attribute indicative to the sort of the data receivable by the destination terminal when the judging means judges that the sort of the data to be transmitted does not conform to the attribute of the destination terminal; and means for transmitting the data converted by the converting means through a network control means associated with the sort of data receivable by the destination terminal.

11. A multi-medium store-and-forward exchange apparatus as set forth in claim 10, wherein the plurality of network control means comprises at least two of a first network control means connected to a first line network for transmitting picture data corresponding to a picture image composed of a plurality of characters, a second network control means connected to a second line network for transmitting voice data corresponding to a voice, and third network control means connected to a third line network for transmitting character data composed of character codes.

12. A multi-medium store-and-forward exchange apparatus as set forth in claim 10, wherein the converting means performs mutual conversion among picture data corresponding to a picture image composed of a plurality of characters, voice data corresponding to a voice, and character data composed of a plurality of character codes.

13. A multi-medium store-and-forward exchange apparatus as set forth in claim 10, wherein the converting means comprises:

first converting means for analyzing picture data corresponding to a picture image composed of a plurality of characters and for converting the picture data into character data composed of character codes corresponding to characters constituting the picture data;

second converting means for analyzing voice data and for converting voice data into character data composed of character codes corresponding to characters of voice constituting the voice data; and third converting means for analyzing character data composed of a plurality of character codes and for converting the character data into picture data corresponding to a picture image composed of characters represented by the character codes and for converting the character data into voice data corresponding to the characters represented by the character codes.

14. A multi-medium store-and-forward exchange apparatus comprising:

a plurality of network control means, each connected to a different line network having a plurality of lines, for transmitting and receiving a plurality of types of mutually convertible data having different signal formats, each of the network control means being provided in association with a type of data;

storage means for storing notification terminal data indicative of a terminal to receive notification of the data arrival and identification of a destination terminal, the data to be transmitted being received by the plurality of network control means through the plurality of line networks;

judging means for judging, when data stored in the storage means is to be transmitted, whether or not a first attribute indicative of a type of data to be transmitted conforms to a second attribute indicative of a type of data receivable by the destination terminal;

data conversion means for converting the data to be transmitted into a type of data which conforms to the second attribute when the judging means judges that the first attribute does not conform to the second attribute;

transmission control means for transmitting the data converted by the data conversion means through the network control means provided in association with the type of the converted data; and data arrival notification means for notifying a terminal corresponding to the terminal data stored in the storage means of data arrival by a type of data receivable by the notified terminal.

15. A multi-medium store-and-forward exchange apparatus comprising:

a plurality of network control means, each connected to a line network through a plurality of lines, for transmitting and receiving a plurality of sorts of mutually convertible data having different signal formats, each of the network control means being provided in association with a sort of data;

storage means for storing therein data received by the plurality of network control means through the plurality of line networks, the data being transmitted from originator terminals to destination users;

means for registering a plurality of receiver terminals capable of receiving different sorts of data in correspondence with the destination user;

retrieval means for retrieving, when the data stored in the storage means is to be transmitted, a registered receiver terminal capable of receiving the data transmitted from the originating terminal;

monitor means for monitoring states of the lines connected to each of the plurality of network control means;

data conversion means for converting the data to be transmitted into a sort of data associated with different registered receiver terminal associated with a network control means connected to an idle line when the monitoring means judges on the basis of monitored results the absence of any idle one of the lines connected to the network control means provided in association with the sort of data associated with the receiver terminal retrieved by the retrieving means; and transmission control means for transmitting the data converted by the data conversion means through the network control means connected to an idle line.

16. A multi-medium store-and-forward exchange apparatus as set forth in claim 15, wherein the register means comprises:

a first table for storing, in association with user's identification codes, terminal identification codes used for identifying a first terminal capable of receiving picture data, a second terminal capable of receiving voice data, a third terminal capable of receiving character data, and a fourth terminal capable of receiving notification information; and a second table for storing therein dial numbers of the terminals in association with the terminal identification codes.

17. A multi-medium store-and-forward exchange apparatus as set forth in claim 15, wherein the monitor means comprises:
- a table for storing therein use states of the lines connected to the plurality of network control means, and judging means for judging states of the lines corresponding to the plurality of network control means on the basis of contents of the table.

18. A multi-medium store-and-forward exchange apparatus comprising:
- a plurality of network control means, each connected to a line network having a plurality of lines, for transmitting and receiving a plurality of sorts of mutually convertible data having different signal formats, each of the network control means being provided in association with a sort of data;
- storage means for storing data received by the plurality of network control means through the plurality of line networks, the data to be transmitted from originator terminals to destination users;
- register means for registering a plurality of receiver terminals capable of receiving different sorts of data in correspondence with the destination users and notification terminals to which transmission of the data to the destination users is notified;
- retrieval means for retrieving, when the data stored in the storage means is to be transmitted, one of the receiver terminals being registered in the register means and being capable of receiving the data transmitted from the originator terminal;
- monitor means for monitoring states of the lines connected to the plurality of network control means;
- data conversion means, when the monitor means monitors the absence of any idle one of the lines connected to the network control means provided in association with the sort of data associated with the receiving terminal retrieved by the retrieving means, for converting the data to be transmitted into another sort of data associated with another receiver terminal registered in the register means and associated with a network control means connected to an idle line;
- transmission control means for transmitting the data converted by the data conversion means through the network control means connected to an idle line; and
- data arrival notification means for notifying the terminals registered in the register means of arrival of the data to the destination terminal by the sort of data receivable by the notification terminals.

19. A multi-medium store-and-forward exchange apparatus as set forth in claim 18, wherein the register means comprises:
- means for storing a first table, in association with user's identification codes, of terminal identification codes used for respectively identifying a first terminal capable of receiving picture data, a second terminal capable of receiving voice data, a third terminal capable of receiving character data, and a fourth terminal capable of receiving notification data;
- means for storing a second table of dial numbers of the terminals in association with the terminal identification codes; and
- means for storing a third table of notification terminal identification data used for identifying the notification terminals.

20. A multi-medium store-and-forward exchange apparatus as set forth in claim 18, wherein the monitor means comprises:
- means for storing and updating a table of use states of the lines connected to the plurality of network control means; and
- judging means for judging states of the lines corresponding to the network control means on the basis of contents of the table.

21. A method of controlling a multi-medium store-and-forward exchange apparatus comprising a plurality of network control means each being connected to each of a plurality of sorts of line networks through lines thereof, for transmitting and receiving a plurality of sorts of mutually convertible data having different signal formats, each of the network control means being provided in association with each sort of data, and storage means for storing therein the plurality of sorts of data received by the plurality of network control means through the plurality of line networks, the method comprising the steps of;
- monitoring states of the lines connected to the plurality of network control means;
- when data stored in the storage means is to be transmitted and when the monitor means judges on the basis of its monitored results the absence of any idle one of the lines connected to one of the network control means provided in association with the sort of the data to be transmitted, for converting the data to be transmitted into another sort of data associated with another network control means connected to an idle line; and
- transmitting the converted data through the another network control means connected to the idle line.

22. A method of controlling a multi-medium store-and-forward exchange apparatus comprising a plurality of network control means each connected to each of a plurality of sorts of line networks through lines thereof, for transmitting and receiving a plurality of sorts of mutually convertible data having different signal formats, each of the network control means being provided in association with each sort of data, and storage means for storing therein the plurality of sorts of data received by the plurality of network control means through the plurality of line networks, the method comprising the steps of;
- when data stored in the storage means is to be transmitted, judging whether or not the sort of the data to be transmitted conforms to an attribute indicative of a sort of data receivable by a destination terminal;
- when the judging means judges that the sort of the data to be transmitted does not conform to the attribute of the destination terminal, converting the data to be transmitted into another sort of data which conforms to the attribute of the destination terminal; and
- transmitting the converted data through the network control means provided in association with the sort of the converted data.

23. A method of controlling a multi-medium store-and-forward exchange apparatus comprising a plurality of network control means each connected to each of a plurality of sorts of line networks through lines thereof, for transmitting and receiving a plurality of sorts of mutually convertible data having different signal formats, each of the network control means being provided in association with each sort of data, and storage means for storing therein data to be transmitted to destination terminals and notification terminal data indicative of notification terminals to which transmission of the data is notified, the data being received by the plurality of network control means through the plurality of line networks, the method comprising the steps of;

when data stored in the storage means is to be transmitted, judging whether or not a first attribute indicative or a sort of the data to be transmitted conforms to a second attribute indicative of a sort of data receivable by the destination terminals;

when the judging means judges that the first attribute does not conform to the second attribute, converting the data to be transmitted into another sort of data which conforms to the second attribute;

transmitting the converted data through the network control means provided in association with the sort of the converted data; and notifying a terminal associated with the notification terminal data stored in the storage means of data arrival by a sort of data receivable by the notified terminal.

* * * * *